US011992763B2

(12) United States Patent
Hu

(10) Patent No.: US 11,992,763 B2
(45) Date of Patent: May 28, 2024

(54) METHOD AND SYSTEM FOR ATTRIBUTION CONTROL OF MAP PIXELS IN GAME MAP, AND COMPUTER-READABLE STORAGE MEDIUM

(71) Applicant: Shanghai Lilith Network Technology Company Limited, Shanghai (CN)

(72) Inventor: Ting Hu, Shanghai (CN)

(73) Assignee: Shanghai Lilith Network Technology Company Limited, Shanghai (CN)

( * ) Notice: Subject to any disclaimer, the term of this patent is extended or adjusted under 35 U.S.C. 154(b) by 0 days.

(21) Appl. No.: 17/784,001

(22) PCT Filed: May 31, 2021

(86) PCT No.: PCT/CN2021/097216
§ 371 (c)(1),
(2) Date: Jun. 9, 2022

(87) PCT Pub. No.: WO2022/156114
PCT Pub. Date: Jul. 28, 2022

(65) Prior Publication Data
US 2023/0138370 A1 May 4, 2023

(30) Foreign Application Priority Data
Jan. 20, 2021 (CN) .......................... 202110073824.1

(51) Int. Cl.
*A63F 13/24* (2014.01)
*A63F 13/45* (2014.01)
(Continued)

(52) U.S. Cl.
CPC .......... *A63F 13/5378* (2014.09); *A63F 13/45* (2014.09); *A63F 13/52* (2014.09);
(Continued)

(58) Field of Classification Search
CPC ..... A63F 13/5378; A63F 13/55; A63F 13/822
See application file for complete search history.

(56) References Cited

U.S. PATENT DOCUMENTS 5,118,115 A * 6/1992 Codinha ............. A63F 3/00075
273/255
5,415,411 A * 5/1995 Peterson ............. A63F 3/00075
273/237
(Continued)

OTHER PUBLICATIONS

Civilization VI. Wikipedia.org. Online. Accessed via the Internet. Accessed Mar. 8, 2023. <URL: https://en.wikipedia.org/wiki/Civilization_VI> (Year: 2019).*
(Continued)

*Primary Examiner* — Dmitry Suhol
*Assistant Examiner* — Carl V Larsen
(74) *Attorney, Agent, or Firm* — David R. Stevens; Stevens Law Group

(57) ABSTRACT

A method for attribution control includes: configuring an object group including at least a first attribution object and a second attribution object in the game map; where the first attribution object and the second attribution object have an attribution right of any map pixel in the game map; when the first attribution object requests for obtaining an attribution right from a target map pixel, and after the first attribution object obtains the attribution right of the target map pixel, determining whether surrounding map pixels are vacant map pixels; when the some of the surrounding map pixels are vacant map pixels, allocating attribution rights of the vacant map pixels to the first attribution object; connecting peripheral boundaries of original map pixels, the target map pixel, and the vacant map pixels whose attribution rights belong to the first attribution object, to form an updated area boundary of the first attribution object.

6 Claims, 2 Drawing Sheets

(51) Int. Cl.
    *A63F 13/52*     (2014.01)
    *A63F 13/5372*     (2014.01)
    *A63F 13/5378*     (2014.01)
    *A63F 13/55*     (2014.01)
    *A63F 13/822*     (2014.01)

(52) U.S. Cl.
    CPC .......... *A63F 13/5372* (2014.09); *A63F 13/55* (2014.09); *A63F 13/822* (2014.09); *A63F 2300/807* (2013.01)

(56) References Cited

U.S. PATENT DOCUMENTS

| | | | | |
|---|---|---|---|---|
| 9,336,618 | B1* | 5/2016 | Fontaine | G06F 16/435 |
| 11,055,885 | B1* | 7/2021 | Schwaiger | A63F 13/352 |
| 2003/0062679 | A1* | 4/2003 | Chang | A63F 3/00075 |
| | | | | 273/255 |
| 2014/0024445 | A1* | 1/2014 | Aller | G07F 17/3225 |
| | | | | 463/29 |
| 2021/0101074 | A1* | 4/2021 | Hemby | A63F 13/2145 |

OTHER PUBLICATIONS

Territory (Civ 6). civilization.fandom.com. Online. Dec. 21, 2020. Accessed via the Internet. Accessed Mar. 8, 2023. <URL: https://civilization.fandom.com/wiki/Territory_(Civ6)?oldid=276108> (Year: 2020).*

City (Civ 6). civilization.fandom.com. Online. Mar. 20, 2021. Accessed via the Internet. Accessed Mar. 8, 2023. <URL: https://civilization.fandom.com/wiki/City_(Civ6)?oldid=291962> (Year: 2021).*

[En] Avanced Guide #1—Borders expansion. Youtube.com. Online. Dec. 9, 2017. Accessed via the Internet. Accessed Mar. 8, 2023. <URL: https://www.youtube.com/watch?v=To5Uq-0NeFc> (Year: 2017).*

Maximum City Size. Reddit.com. Online. 2018. Accessed via the Internet. Accessed Mar. 8, 2023. <URL: https://www.reddit.com/r/civ6/comments/7sa3gp/maximum_city_size/> (Year: 2018).*

Control of hexes?. boardgamegeek.com. Online. Jan. 15, 2020. Accessed via the Internet. Accessed Mar. 8, 2023. <URL: https://boardgamegeek.com/thread/2347811/control-hexes> (Year: 2020).*

World Map (Concept). Giantbomb.com. Online. Apr. 8, 2019. Accessed via the Internet. Accessed Sep. 26, 2023. <URL: https://web.archive.org/web/20190408040557/https://www.giantbomb.com/world-map/3015-611/> (Year: 2019).*

Grid-Based Movement (Concept). Giantbomb.com. Online. Jun. 20, 2019. Accessed via the Internet. Accessed Sep. 26, 2023. <URL: https://web.archive.org/web/20190620233350/https://www.giantbomb.com/grid-based-movement/3015-1318/> (Year: 2019).*

* cited by examiner

METHOD AND SYSTEM FOR ATTRIBUTION CONTROL OF MAP PIXELS IN GAME MAP, AND COMPUTER-READABLE STORAGE MEDIUM

TECHNICAL FIELD

The present invention relates to the field of game control, in particular, to a method and a system for attribution control of map pixels in a game map, and a computer-readable storage medium.

BACKGROUND

With the rapid development of intelligent terminals, it becomes more common for users to use the intelligent terminals to perform various operations, and it is especially common to use the intelligent terminals to play games. An SLG game (simulation game) is used as an example, a large number of game maps need to exist in a game for users to operate game objects to move in the game maps.

In the prior art, the game maps in the game are distinguished by using an area coloring method, and the game maps that do not belong to the same camp and the same player are marked as different map areas. When the player needs to expand the territory in the game map, a single capture mode is adopted, that is, each time a plot is occupied, an attack operation needs to be performed on the plot. This kind of operation is too simple and cumbersome, and it is impossible to use convenient means to occupy plots of different attributes, such as a neutral area or an area without troops stationed by other parties, the player's operation is complicated, and consequently the background calculation load is large.

Therefore, there is a need for a new method and a system for attribution control of map pixels in a game map, and a computer-readable storage medium, the attribution of map pixels on the game map can be quickly allocated and refreshed according to the different attributes of the plots, so that operating time of the player can be saved.

SUMMARY

To overcome the technical defects, an objective of the present invention is to provide a method and a system for attribution control of map pixels in a game map, to improve experience of game players, and reduce load on the system.

The present invention discloses a method for attribution control of game pixels in a game map, including the following steps:

configuring an object group including at least a first attribution object and a second attribution object in the game map; where the first attribution object and the second attribution object have an attribution right of any map pixel in the game map;

when the first attribution object requests for obtaining an attribution right from a target map pixel whose attribution right is not associated with the first attribution object in the game map, and after the first attribution object obtains the attribution right of the target map pixel, determining whether surrounding map pixels adjacent to n layers from the target map pixel are vacant map pixels;

when some of the surrounding map pixels adjacent to n layers from the target map pixel are vacant map pixels, allocating attribution rights of the vacant map pixels to the first attribution object; and connecting peripheral boundaries of original map pixels, the target map pixel, and the vacant map pixels whose attribution rights belong to the first attribution object, to form an updated area boundary of the first attribution object.

Preferably, when the first attribution object requests for obtaining an attribution right from a target map pixel whose attribution right is not associated with the first attribution object in the game map, and after the first attribution object obtains the attribution right of the target map pixel, determining whether surrounding map pixels adjacent to n layers from the target map pixel are vacant map pixels includes:

selecting, by the first attribution object, a map pixel adjacent to one of the original map pixels that are located at the edge in an original area map with attribution right as the target map pixel, where the attribution right of the target map pixel is not associated with the first attribution object;

initiating, by the first attribution object, a request for obtaining an attribution right to the target map pixel, and obtaining the attribution right of the target map pixel;

determining whether the attribution right of each surrounding map pixel adjacent to the n-layer from the target map pixel is associated with the second attribution object, or whether there is a game unit on the surrounding map pixel; and when the attribution right of each surrounding map pixel adjacent to the n-layer from the target map pixel is not associated with the second attribution object, nor there is no game unit on the surrounding map pixel, determining that the surrounding map pixels are vacant map pixels.

Preferably, when some of the surrounding map pixels adjacent to the n-layer from the target map pixel are vacant map pixels, the allocating attribution rights of the vacant map pixels to the first attribution object includes:

when some of the bordering map pixels that are closely connected with the target map pixel are vacant map pixels, allocating attribution rights of the vacant map pixels in the bordering map pixels to the first attribution object; and when some of the indirect map pixels that are closely connected with the bordering map pixels are vacant map pixels, allocating attribution rights of the vacant map pixels in the indirect map pixels to the first attribution object, until the number of interval layers between the indirect map pixels and the target map pixel is n−1.

Preferably, the method further includes the following steps:

selecting a game playing time point for configuring the object group as a starting time point; and from the starting time point, expanding the number of n layers every adjustment time t.

Preferably, the method further includes the following steps:

after the first attribution object obtains the attribution right of the map pixels, rendering a first color to the map pixels, to represent a map area of the first attribution object.

The present invention further discloses a system for attribution system for attribution control of map pixels in a game map, and the system for attribution system includes:

a configuration module that configures an object group including at least a first attribution object and a second attribution object in a game map, and allocates an attribution right of any map pixel in the game map to the first attribution object or the second attribution object;

a combat module that controls, based on an operation instruction, the first attribution object to request for obtaining an attribution right from a target map pixel whose attribution right is not associated with the first attribution object in the game map, and after the first attribution object obtains the attribution right of the target map pixel, determines whether the surrounding map pixels adjacent to the n-layer from the target map pixel are vacant map pixels;

a delimiting module that delimits, when some of the surrounding map pixels adjacent to the n-layer from the target map pixel are vacant map pixels, attribution rights of the vacant map pixels to the first attribution object; and an updating module that connects peripheral boundaries of original map pixels, the target map pixel, and the vacant map pixels whose attribution rights belong to the first attribution object, to form an updated area boundary of the first attribution object.

The present invention further discloses a computer-readable storage medium on which a computer program is stored, and when the computer program is executed by a processor, the above steps are implemented.

After the technical solution is adopted, compared with the prior art, the technical solution has the following beneficial effects:

1. For the control map pixels in the game map, attribution rights of the control map pixels can be quickly updated, and waiting time of the player can be reduced;
2. The gameplay of the game is enriched, and player experience of the game application program is improved.

DETAILED DESCRIPTION

Figure 1:
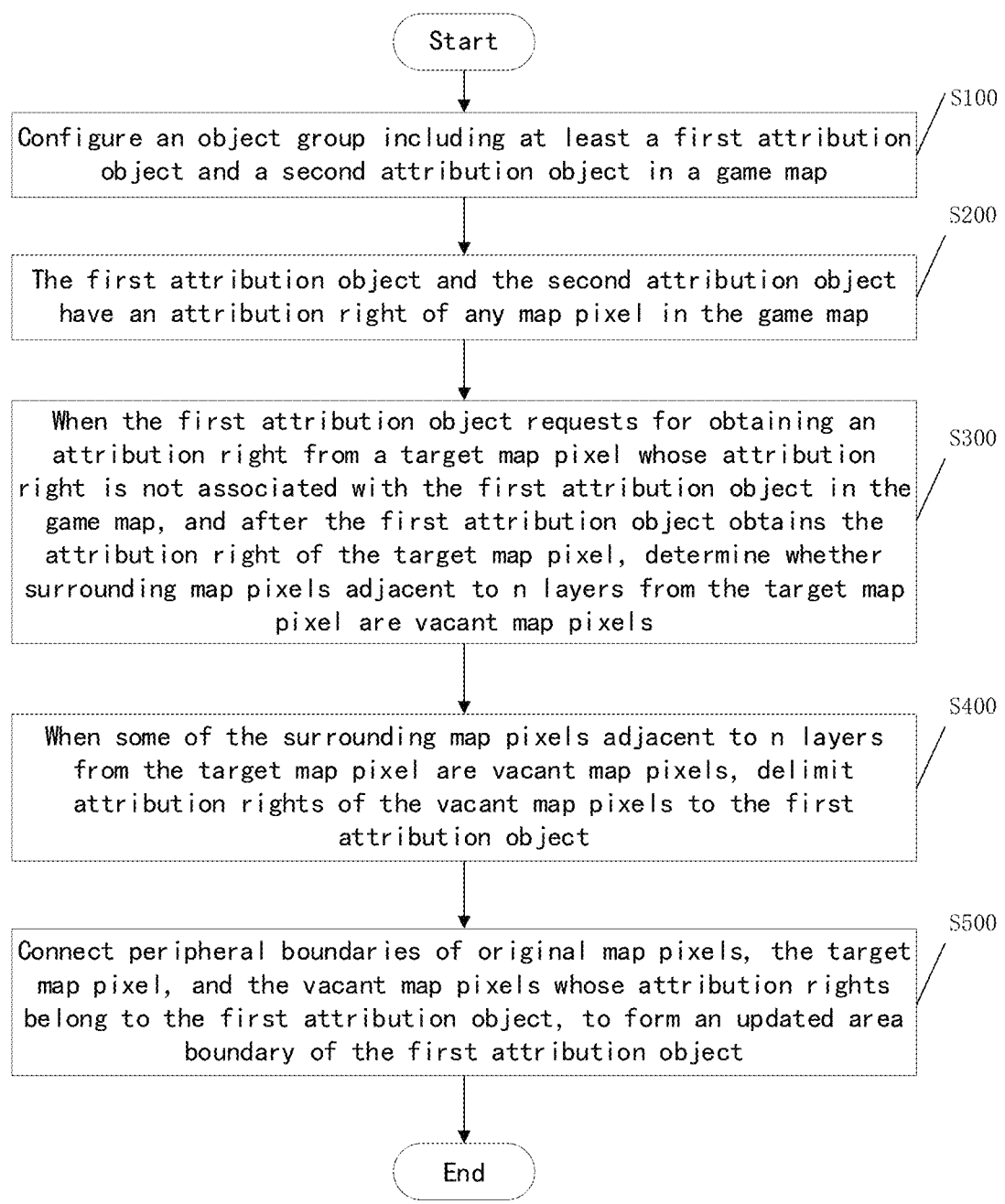
FIG. 1 is a schematic flowchart of a method for attribution control of map pixels in a game map in accordance with a preferred embodiment of the present invention.

Advantages of the present invention are further described below with reference to the drawings and specific embodiments.

The exemplary embodiments are described in detail herein, and examples thereof are shown in the accompanying drawings. When the following description involves the drawings, unless otherwise indicated, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should further be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

In the description of the present invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the present invention and simplifying the description, and do not indicate or imply that the pointed device or element must have a specific orientation, or be constructed and operated in a specific orientation, and therefore cannot be understood as a limitation of the present invention.

In the description of the present invention, unless otherwise specified and limited, it should be noted that the terms "installed", "joint", and "connection" should be understood in a broad sense. For example, the connection may be a mechanical connection or an electrical connection, or may be internal communication between two elements, or may be a direct connection or an indirect connection through an intermediate medium. For the person of ordinary skill in the art, the specific meaning of the above terms can be understood according to specific conditions.

In the subsequent descriptions, a suffix such as "module", "component", or "unit" used to represent an element is merely used to facilitate description of the present invention, and does not have specific meanings. Therefore, "module" and "component" can be mixed for using.

Basic elements of a game map are map pixels, and the map pixels are combined to form a game map. When a game application program runs in an intelligent terminal, the game map is displayed in an interaction interface, and indicates that a movable position of a hero used as a game unit on an area in the game application program. The pixel referred to in the present invention is the smallest unit that constitutes a game map or a map area, and in the embodiment of the present invention, a regular hexagonal or a regular quadrilateral map pixel is mainly used. Certainly, the specific shape of the map pixel is not limited. A regular hexagonal map pixel is used as an example, and edges of the hexagonal map pixel are defined as follows: Ei represents an orientation of an edge of the regular hexagonal map pixel; Pi is orientations of six fixed points of the regular hexagonal map pixel; OpEi is an opposite side of Ei. Based on the definition of the regular hexagonal map pixel, a set formed by combining multiple map pixels forms a map area in the game map, that is, a set of connected map pixels on the map at a certain distance from a center point of the area. For a game in general, the entire game map should be covered by all map areas, that is, there is no blank map pixel in the game map.

Referring to FIG. 1, FIG. 1 is a schematic flowchart of a method for attribution control of map pixels in a game map in accordance with a preferred embodiment of the present invention. In this embodiment, the method for attribution control includes the following steps:

S100: Configure an object group including at least a first attribution object and a second attribution object in a game map.

When a game application program runs, a game map contained in the game application program is configured with multiple object groups. Different object groups can be divided by different game players. For example, different game players form different object groups, or neutral units in the game map, such as mountains, rivers, buildings and other non-moving units in the game map, or neutral characters that are non-player-controlled characters (NPCs) can also be used as object groups. Therefore, it is understood that, due to different natures of the object groups, the units divided into different object groups are delimited to different attribution objects. For example, one game player is the first attribution object, and another game player is the second attribution object. When there are more game players, the number of attribution objects increases. In this embodiment, because it is necessary to distinguish which attribution object a map pixel should belong to, there should be more than two attribution objects. At the same time, when neutral units appear in the game map, all neutral units that do not have an attribution right can be combined into one attribution object, such as a third attribution object.

S200: The first attribution object and the second attribution object have an attribution right of any map pixel in the game map.

The first attribution object and the second attribution object have certain attribution rights of some of the map pixels in the game map. For example, some map pixels belong to a certain player, and the player allocates troops and builds building units on the occupied map pixels, and this indicates the attribution right. At the same time, in order to inform other game players (attribution objects) of the attribution rights of the map pixels, the map pixels can be rendered in color, that is, the attribution rights of different map pixels owned by different attribution objects are identified on the game map by using different colors.

S300: When the first attribution object requests an attribution right from a target map pixel whose attribution right is not associated with the first attribution object in the game map, and after the first attribution object obtains the attribution right of the target map pixel, determine whether surrounding map pixels adjacent to n layers from the target map pixel are vacant map pixels.

When a game player expects to occupy a certain map pixel, that is, it indicates that the first attribution object requests an attribution right from a target map pixel, and the attribution right of the target map pixel is not associated with the first attribution object. It can be understood that the attribution right of the target map pixel is not associated with the first attribution object, but may be associated with the second attribution object (belong to another player) or the third attribution object (in a neutral state). After the above occupation expectation is completed, for example, after the first attribution object defeats troops of another player on the target map pixel and configures its own troops, the first attribution object takes the target map pixel as its own, thereby obtaining the attribution right of the target map pixel. In this embodiment, after the attribution right of the target map pixel is obtained, it is additionally determined whether surrounding map pixels adjacent to n layers from the target map pixel are vacant map pixels, and the surrounding map pixels adjacent to n layers from the target map pixel are map pixels that are adjacent to the target map pixel and expanded layer by layer by using the target map pixel as the center. For example, when the target map pixel is a quadrilateral, map pixels adjacent to four sides of the quadrilateral are surrounding map pixels and are surrounding map pixels of the first layer, and map pixels that obliquely intersect with four corners of the quadrilateral are also surrounding map pixels, and are also surrounding map pixels of the first layer (similar to eight surrounding mines in the minesweeper game), and further out, map pixels adjacent to or obliquely intersecting with the surrounding map pixels of the first layer are surrounding map pixels of the second layer, by analog, for a target map pixel, the surrounding map pixels adjacent to n layers ($n \in N^*$) from the target map pixel are determined.

It can be understood that the vacant map pixels described in the above embodiments are map pixels that belong to a neutral unit or may do not belong to any unit, that is, map pixels that do not have any attribution, or may be map pixels that belong to the second attribution object, but the second attribution object does not configure troops or build buildings in the map pixels (for example, the second attribution object sees the map pixels as idle or of low value).

S400: When some of the surrounding map pixels adjacent to n layers from the target map pixel are vacant map pixels, delimit attribution rights of the vacant map pixels to the first attribution object.

Figure 2:
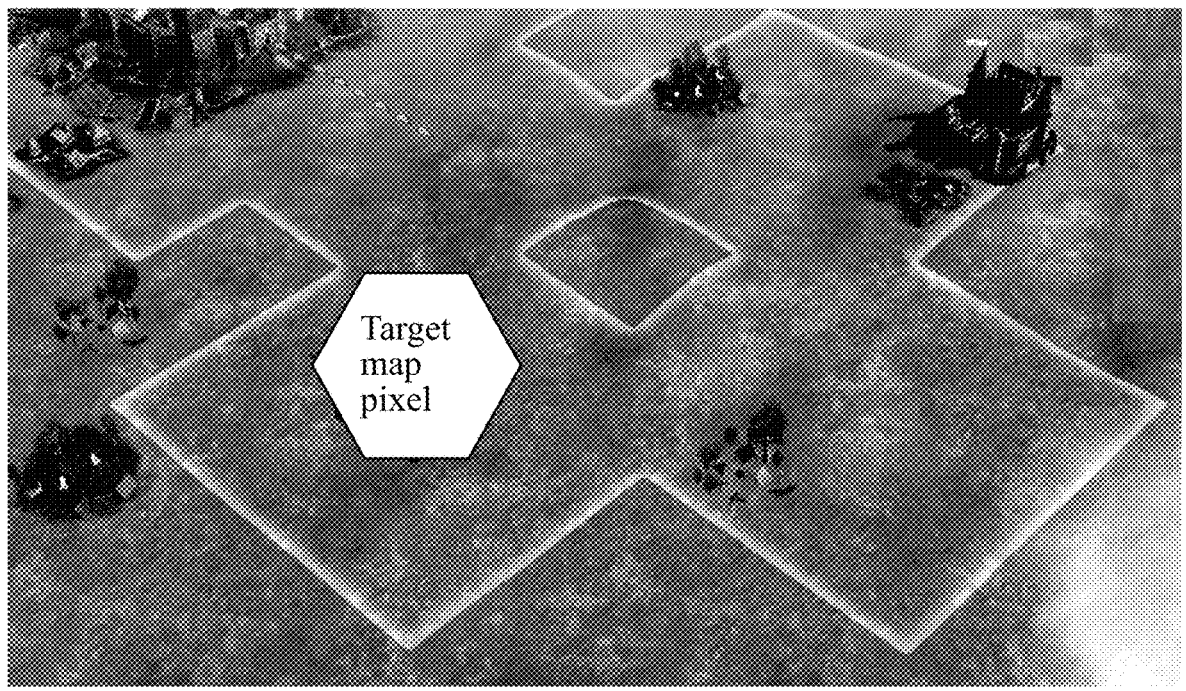
FIG. 2 is a schematic diagram of obtaining attribution rights for vacant map pixels in accordance with a preferred embodiment of the present invention.

When it is determined that all or some of the surrounding map pixels are vacant map pixels, attribution rights of these vacant map pixels are delimited to the first attribution object. That is, although the first attribution object only expresses its willingness to obtain the attribution right to the target map pixel, when the surrounding map pixels around the target map pixel are vacant, the surrounding map pixels are delimited to the first attribution object at one time. Referring to FIG. 2, for an occupation action of the first attributable object, multiple map pixels are occupied at the same time, and the game player does not need to obtain attribution rights for all map pixels one by one. Under the above configuration, time of the game player can be saved, and a background server also processes fewer data requests, so that load is reduced.

S500: Connect peripheral boundaries of original map pixels, the target map pixel, and the vacant map pixels whose attribution rights belong to the first attribution object, to form an updated area boundary of the first attribution object.

After the attribution rights of the vacant map pixels are changed, in order to show the result of the change to the game player, or to show other game players the real-time change and interaction result of the game map, peripheral boundaries of original map pixels (that is, map pixels originally held or occupied by the first attribution object), the target map pixel, and the vacant map pixels whose attribution rights belong to the first attribution object are connected, thereby forming an updated area boundary of the first attribution object after changing. The attribution rights of all map pixels within the updated area boundary belong to the first attribution object.

It can be understood that, the connection of the peripheral boundaries is usually connection of boundaries of some map pixels that are of all the connected map pixels belonging to the first attributable object and that are at the outermost edge of the map area. If some map pixels are independent of other map pixels, the self-boundary of the map pixels forms an updated area boundary of the map area.

In a preferred embodiment, step S300 includes:

S310: The first attribution object selects a map pixel adjacent to one of the original map pixels that are located at the edge in the original area map with attribution right as the target map pixel, and the attribution right of the target map pixel is not associated with the first attribution object.

In a specific embodiment, the target map pixel selected by the first attribution object is a map pixel adjacent to one of the original map pixels located at the edge in the original area map occupied by the first attribution object. In this way, it can be avoided that all the surrounding map pixels belong to the first attribution object, and the performing of step S400 is wasted. That is, some of the surrounding map pixels are necessarily map pixels whose attribution rights do not belong to the first attribution object.

S320: The first attribution object initiates a request for obtaining an attribution right to the target map pixel, and obtains the attribution right of the target map pixel.

S330: Determine whether the attribution right of each surrounding map pixel adjacent to n layers from the target map pixel is associated with the second attribution object, or whether there is a game unit on the surrounding map pixel.

S340: When the attribution right of each surrounding map pixel adjacent to n layers from target map pixel is not associated with the second attribution object, nor there is no game unit on the surrounding map pixel, determine that the surrounding map pixels are vacant map pixels. For example, the surrounding map pixel does not belong to any attribution object; alternatively, although the surrounding map pixel belongs to a certain attribution object, the attribution object does not configure game units such as soldiers or buildings on the surrounding map pixel, it is determined that the surrounding map pixel is a vacant map pixel.

In another preferred embodiment, step S400 includes:

S410: When some of the bordering map pixels that are closely connected with the target map pixel are vacant map pixels, attribution rights of the vacant map pixels in the bordering map pixels are delimited to the first attribution object.

The allocation of attribution rights of the vacant map pixels is performed layer by layer, that is, in the first layer, when some of the bordering map pixels that are closely connected with (adjacent and close to) the target map pixel are vacant map pixels, attribution rights of the vacant map pixels in the bordering map pixels are delimited to the first attribution object.

S420: When some of indirect map pixels that are closely connected with bordering map pixels are vacant map pixels, attribution rights of the vacant map pixels in the indirect map pixels are delimited to the first attribution object, until the number of interval layers between the indirect map pixels and the target map pixel is n−1.

In the second layer formed by going out layer by layer, when some of the indirect map pixels closely connected with the bordering map pixels (adjacent to the bordering map pixels, but not adjacent to the target map pixel) are vacant map pixels, attribution rights of the vacant map pixels in the indirect map pixels are delimited to the first attribution object. After the above step is performed for each layer, performing of the step is cut off when the number of interval layers between the indirect map pixels and the target map pixel is n−1, that is, performing of the step is cut off after attribution rights of the surrounding map pixels of the outermost layer are delimited. It can be understood that, in different embodiments, the number of n can be freely configured according to the size of the game map and the number of game players. For example, n can be 1, and the game player need to perform expanding outward in a single layer.

In a preferred embodiment, selection of n layers is no longer cure. Conversely, a game playing time point for configuring the object group is selected as a starting time point, and from the starting time point, the number of n layers is expanded every adjustment time t. The above configuration mainly considers that in some games, when the game playing time becomes longer, the number of game players may decrease, and there are only two or three game players that are against each other. In this case, in order to speed up the game process, the number of n can be increased, so that the chance of confrontation among gamer players is improved. As in other embodiments, the adjustment time t can also be freely configured and is not a fixed value. Alternatively, for different attribution objects, the value of n varies with the number of map pixels in the original map area. For example, if the number of map pixels whose attribution rights belong to the first attribution object is significantly bigger than the number of map pixels whose attribution rights belong to another attribution object, the value of n associated with the first attribution object can be configured to be significantly smaller than the value of n associated with the other attribution object. On the one hand, the game environment can be balanced, and on the other hand, the strong players can be restricted accordingly, and experience of game players is improved. The value of n may be related to the number of game players, the size of the game map, and the setting of the consumption point by the game manufacturer.

In another preferred embodiment, the method for attribution control further includes the following steps:

S600: After the first attribution object obtains attribution rights of the map pixels, render a first color to the map pixels, to represent a map area of the first attribution object.

In this step S600, the vacant map pixels whose rights are newly obtained by the first attribution object are rendered with the first color associated with the first attribution object. As long as the attribution rights belong to the first attribution object, the map pixels are represented by the same color, to experience the map area owned by the first attribution object, so that user experience is interactively improved.

Figure 3:
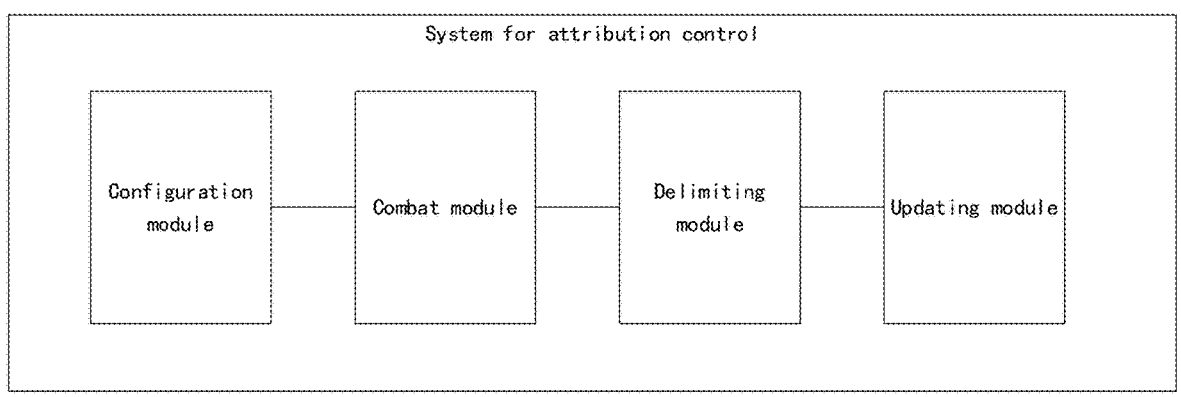
FIG. 3 is a schematic structural diagram of a system for attribution control of map pixels in a game map in accordance with a preferred embodiment of the present invention.

Referring to FIG. 3, FIG. 3 is a system for attribution control of map pixels in a game map in accordance with a preferred embodiment of the present invention. In this embodiment, the system for attribution control includes: a configuration module that configures an object group including at least a first attribution object and a second attribution object in a game map, and allocates an attribution right of any map pixel in the game map to the first attribution object or the second attribution object; a combat module that controls, based on an operation instruction, the first attribution object to request an attribution right from a target map pixel whose attribution right is not associated with the first attribution object in the game map, and after the first attribution object obtains the attribution right of the target map pixel, determines whether surrounding map pixels adjacent to n layers from the target map pixel are vacant map pixels; a delimiting module that delimits, when some of the surrounding map pixels adjacent to n layers from the target map pixel are vacant map pixels, attribution rights of the vacant map pixels to the first attribution object; and an updating module that connects peripheral boundaries of original map pixels, the target map pixel, and the vacant map pixels whose attribution rights belong to the first attribution object, to form an updated area boundary of the first attribution object.

In yet another preferred embodiment, a computer-readable storage medium is further disclosed on which a computer program is stored. When the computer program is executed by a processor, the above steps are implemented.

An intelligent terminal can be implemented in various forms. For example, the terminal described in the present invention may include an intelligent terminal such as a mobile phone, a smart phone, a notebook computer, a PDA (Personal Digital Assistant), a PAD (Tablet Computer), a PMP (Portable Multimedia Player), a navigation device, etc., as well as an intelligent terminal such as a navigation apparatus, and a fixed terminal such as a digital TV, a desktop computer, etc. It is assumed that the terminal is an intelligent terminal below. However, a person skilled in the art understood that the configuration according to the embodiments of the present invention can also be applied to a fixed-type terminal, in addition to elements particularly used for mobile purposes.

It should be noted that the embodiments of the present invention have better implementations and do not limit the present invention in any form. Any person skilled in the art may use the technical content disclosed above to change or modify equivalent effective embodiments. However, any modifications or equivalent changes and modifications made to the above embodiments based on the technical essence of the present invention without departing from the content of the technical solution of the present invention still fall within the scope of the technical solution of the present invention.

What is claimed is:

1. A method for attribution control of map pixels in a game map, comprising the following steps performed by a processing system associated with an intelligent terminal:
    configuring an object group comprising at least a first attribution object and a second attribution object in the game map, wherein the game map is included in a multiplayer video game implemented on the processing system, and wherein the game map is comprised of a plurality of map pixels that are rendered as a corresponding plurality of graphics pixels on a visual display monitor included in the intelligent terminal during gameplay; wherein
    the first attribution object and the second attribution object have an attribution right of any map pixel in the game map;
    when the first attribution object requests for obtaining an attribution right from a target map pixel whose attribution right is not associated with the first attribution object in the game map, and after the first attribution object obtains the attribution right of the target map pixel, determining whether surrounding map pixels adjacent to n layers from the target map pixel are vacant map pixels, wherein n is a variable quantity that adaptively depends on the vacancy;
    when some of the surrounding map pixels adjacent to n layers from the target map pixel are vacant map pixels, allocating attribution rights of the vacant map pixels to the first attribution object;
    connecting peripheral boundaries of original map pixels, the target map pixel, and the vacant map pixels whose attribution rights belong to the first attribution object, to form an updated area boundary of the first attribution object;
    outputting the updated first attribution object to an interaction interface associated with the intelligent terminal, wherein the interaction interface is presented on the visual display monitor;
    selecting a game playing time point for configuring the object group as a starting time point and
    from the starting time point, expanding the number of n layers every adjustment time t, to n+m layers, where m>=1.

2. The method for attribution control according to claim 1, wherein when the first attribution object requests for obtaining an attribution right from a target map pixel whose attribution right is not associated with the first attribution object in the game map, and after the first attribution object obtains the attribution right of the target map pixel, determining whether surrounding map pixels adjacent to n layers from the target map pixel are vacant map pixels comprises:
    selecting, by the first attribution object, a map pixel adjacent to one of the original map pixels that are located at the edge in an original area map with attribution right as the target map pixel, wherein the attribution right of the target map pixel is not associated with the first attribution object;
    initiating, by the first attribution object, a request for obtaining an attribution right to the target map pixel, and obtaining the attribution right of the target map pixel;
    determining whether the attribution right of each surrounding map pixel adjacent to the p-layer from the target map pixel is associated with the second attribution object, or whether there is a game unit on the surrounding map pixel; and
    when the attribution right of each surrounding map pixel adjacent to the n-layer from the target map pixel is not associated with the second attribution object, or there is no game unit on the surrounding map pixel, determining that the surrounding map pixels are vacant map pixels.

3. The method for attribution control according to claim 1, wherein
    when some of the surrounding map pixels adjacent to the n-layer from the target map pixel are vacant map pixels, the allocating attribution rights of the vacant map pixels to the first attribution object comprises:
    when some of the bordering map pixels that are closely connected with the target map pixel are vacant map pixels, allocating attribution rights of the vacant map pixels in the bordering map pixels to the first attribution object; and
    when some of the indirect map pixels that are closely connected with the bordering map pixels are vacant map pixels, allocating attribution rights of the vacant map pixels in the indirect map pixels to the first attribution object, until the number of interval layers between the indirect map pixels and the target map pixel is n−1.

4. The method for attribution control according to claim 1, further comprising the following steps:
    after the first attribution object obtains the attribution right of the map pixels, rendering a first color to the map pixels, to represent a map area of the first attribution object.

5. A system for attribution control of map pixels in a game map, wherein the system for attribution control comprises:
    a processing system associated with an intelligent terminal, the processing system further comprising:

a configuration module that configures an object group comprising at least a first attribution object and a second attribution object in a game map, and allocates an attribution right of any map pixel in the game map to the first attribution object or the second attribution object, wherein the game map is included in a multiplayer video game implemented on the processing system, and wherein the game map is comprised of a plurality of map pixels that are rendered as a corresponding plurality of graphics pixels on a visual display monitor included in the intelligent terminal during gameplay;

a combat module that controls, based on an operation instruction, the first attribution object to request for obtaining an attribution right from a target map pixel whose attribution right is not associated with the first attribution object in the game map, and after the first attribution object obtains the attribution right of the target map pixel, determines whether the surrounding map pixels adjacent to the n-layer from the target map pixel are vacant map pixels;

a delimiting module that delimits, when some of the surrounding map pixels adjacent to the n-layer from the target map pixel are vacant map pixels, attribution rights of the vacant map pixels to the first attribution object, wherein n is a variable quantity that adaptively depends on the vacancy; and an updating module that connects peripheral boundaries of original map pixels, the target map pixel, and the vacant map pixels whose attribution rights belong to the first attribution object, to form an updated area boundary of the first attribution object; and an interaction interface associated with the intelligent terminal, wherein the processing system outputs the updated first attribution object to the interaction interface, wherein the interaction interface is presented on the visual display monitor, and wherein the processing system further selects a game playing time point for configuring the object group as a starting time point, and from the starting time point, expands the number of n layers every adjustment time t, to n+m layers, where m>=1.

6. A non-transitory computer-readable storage medium on which a computer program is stored, wherein, when the computer program is executed by a processor, the steps of claim 1 are implemented.

\* \* \* \* \*